United States Patent [19]

Iseli

[11] Patent Number: 4,949,599

[45] Date of Patent: Aug. 21, 1990

[54] TIPPED TOOLS

[75] Inventor: Benno Iseli, Schotz, Switzerland

[73] Assignee: Iseli & Co. AG, Schotz, Switzerland

[21] Appl. No.: 328,104

[22] Filed: Mar. 23, 1989

[30] Foreign Application Priority Data

Mar. 25, 1988 [GB] United Kingdom ............... 88017125

[51] Int. Cl.⁵ ............................................ B23D 63/00
[52] U.S. Cl. ................. 76/112; 76/DIG. 11;
76/101.1
[58] Field of Search ............... 76/112, 25 R, DIG. 11,
76/101 R

[56] References Cited

U.S. PATENT DOCUMENTS

| 3,034,378 | 5/1962 | Anderson | 76/112 |
| 3,295,396 | 1/1967 | Kolb | 76/25 R |
| 3,800,633 | 4/1974 | Funakubo | 76/112 |
| 4,071,141 | 1/1978 | Gray | 76/112 |

OTHER PUBLICATIONS

Chaston Industrial Saw Ltd. brochure, "Iseli Type SAA Automatic Saw Tipping Machine".

Primary Examiner—Roscoe V. Parker
Attorney, Agent, or Firm—Barnes & Thornburg

[57] ABSTRACT

There is provided a length of material from which may be cut tips for use with tools involving tips of material that is harder than that of the remainder of a tool, wherein said length of material is so preformed as to present at least one axially extending planar surface (17–25) which when a tip forming length (9) is cut therefrom and the tip forming length is mounted to a tool (4), lies substantially at the required operational angle for one of the faces of the tip that is to be involved with the cutting action thereof.

10 Claims, 2 Drawing Sheets

TIPPED TOOLS

This invention relates to the production and repair of tools having cutting teeth provided with tips of harder material than that of the body of the tool. Such tools include saw blades including band, linear, or circular saws, the saws including a plurality of individual teeth each having a cutting tip of hard material.

In particular, the present invention is concerned with tools i.e., saw blades which are provided with tips of a material known as Stellite.

Stellite is essentially presently commercially available in the form of relatively small diameter rods of a circular cross section of a few millimeters in diameter and some 250 to 400 millimeters in length. With present day technology, Stellite is drawn from a melt and because of this serious constraints are imposed upon the possible size of rod or bar that can be drawn. The above Figures representing the presently available size range.

In spite of these restrictions in the availability of Stellite it has been found to be particularly suitable as a material for use as the cutting tips of saw blades The conventional manner in utilising Stellite as a saw blade tipping material is to preform the requisite number of teeth upon the saw blade i.e., circular or band, in such manner that the teeth involve a gullet region at the leading face of the tooth which at its rear end sweeps outwardly from, and in the plane of the blade body, to provide the leading face to the associated tooth and at its leading region the gullet provides a more gradually outwardly and forwardly extending region that provides the rear face of the next adjacent tooth in advance thereof. For any particular tooth the rear and front faces meet at a pointed leading edge region which at least partially overhangs the associated gullet.

It is this pointed leading edge region that is provided with a Stellite hard metal tip.

Stellite tips have hitherto generally been produced by a welding technique by using Stellite rod as a welding rod and depositing blobs of the Stellite upon individual teeth.

More recently, the procedures have been mechanised. One such method has involved clamping the saw blade in a location such that the next tooth to be tipped is located at a tipping station at which an end of a Stellite rod can be presented to the pointed edge at such position and angle to the tooth end face that the Stellite rod is aligned substantially in the direction in which it is required that the mounted tip should bear to the remainder of the tooth. The Stellite rod is so carried by a carrier arrangement that it may be firmly pushed in the axial direction thereof towards the tooth to be tipped whilst the tooth is being simultaneously electrically heated to such temperature that the material of the saw blade melts sufficiently for the pushing force exerted upon the Stellite rod to ram the end of Stellite rod into the body of the tooth thereby spreading tooth material to form a recess or notch for housing the Stellite rod end. The blade tooth is then allowed to cool and the Stellite rod is cut at a preterminded location above the level of the tooth so as to leave, firmly attached to the tooth, a short length of the Stellite rod. This short length of Stellite rod provides the Stellite tip.

The severing of the Stellite rod is at such an angle to the axial direction of the Stellite rod axis that the cut surface of the tip forming portion will serve after suitable machining as the tip top face whilst the complementary face at the bottom of the Stellite rod provides a tip seating surface for the next tip to be produced.

As so far described the tip and the adjacent parts of the blade tooth are totally unusable as a cutting tip since they have to be machined, i.e., ground, into a predetermined shape which involves very carefully defined angular relationships between the top face, the front face and the side faces of the tip.

With the known arrangements the processes adopted for the production of the angular relationships between the aforesaid tooth tip faces involve a considerable amount of machining i.e., grinding, and as a result a considerable amount of time is required for such machining.

In mass production terms it is of very great economic importance to be able to reduce as much as possible the time required for grinding, and also the amount of grinding and associated activities and equipment necessary to mount and grind extremely large numbers of correctly machined tips.

Also, in relation to the mass production and also to the retipping of saw blades, it is of considerable importance to be able to handle efficiently and economically, that is eliminating as much waste of the material when using the actual Stellite rods. In practice, the present day utilisation of the rods is very wasteful having regard to the amount of tip material to be removed by machining so as to attain a requisite profile to the tips.

It is an object of the present invention to provide a method of and arrangements for improved utilisation of Stellite rods or the like when tipping cutter tools such as the teeth of hand or circular saw blades with tips of harder material than that of the remainder of a tooth.

According to a first aspect of the invention there is provided a method of producing from a bar or rod tips which provide the cutting edges of tools involving teeth having tips of material that is harder than that of the remainder of the tool, characterised by forming, during the production of the rod or bar, at least one longitudinally extending planar surface which, when a tip forming length from the bar or rod is mounted to a tooth to be tipped with the planar surface in a predetermined direction with respect to the tool, the planar surface is positioned substantially at the required operational angle for a predetermined one of the working faces of the tip.

Preferably, the tip forming length is provided with two further longitudinally directed planar faces which intersect the plane of the first mentioned planar face and each of which lie at at such angle with respect to the plane of the first mentioned planar face, that on mounting the tip forming length to a tool to be tipped these additional faces are positioned substantially at the required operational angles for the side or flank faces to the tip.

Conveniently, the tip forming bar or rod is provided with four planar longitudinally directed surfaces which are so angularly related to each other that on application of the tip forming length of the bar or rod to a tooth to be tipped, one of the planar surfaces forms the front face of the tip the surface that is opposite to the one face provides a rear face whilst the remaining two surfaces provide the side faces or flanks of the tip.

A second aspect of the invention provides a method of tipping a saw blade by cutting successive tip forming lengths from a rod or bar of the martrial for tipping the teeth of the saw blade characterised by presenting the the end of a rod or bar to the region of the tooth to which a tip is to be fitted such that said planar face or faces are or are correctly oriented with respect to the tool region, securing the end of the tip forming length to the tooth, and in that after the tip forming length has been secured to the tooth severing the rod or bar at such angle with respect to the planar faces as to provide a cut surface which is in substantial alignment with angle required for the top face of a tip.

Preferably, the length of tip forming material comprises Stellite.

For a better understanding of the invention reference will now be made to the accompanying drawings in which:

FIG. 1 very schematically illustrates a fragmentary portion of a cutter tool in the form of a band saw blade before the addition of tips;

FIG. 2 very schematically illustrates a fragmentary portion of a cutter tool in the form of a band saw blade after the addition of conventional tip forming Stellite lengths;

Figure 1:
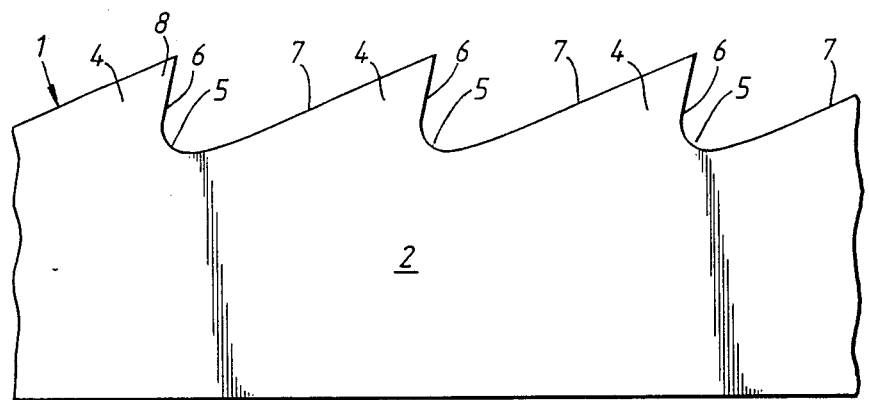

Referring now to FIG. 1 a cutter tool in the form of a band saw blade 1 incorporates a main body 2 of elongate form with a uniformly straight lower edge 3 and body thickness which is very small compared to the overall depth of the main body. The other longer edge region of the main body 2 has formed there along a plurality of regularly spaced apart teeth 4. The teeth have similar forms and are separated by a gullet region 5 providing an outwardly and forwardly inclined front edge 6 to the tooth, and a second outwardly extending relatively shallower forwardly extending edge which provides the rear edge 7 to an adjacent tooth. As may be seen the faces 6 and 7 of each tooth terminates in a sharply pointed end edge region 8.

Figure 2:
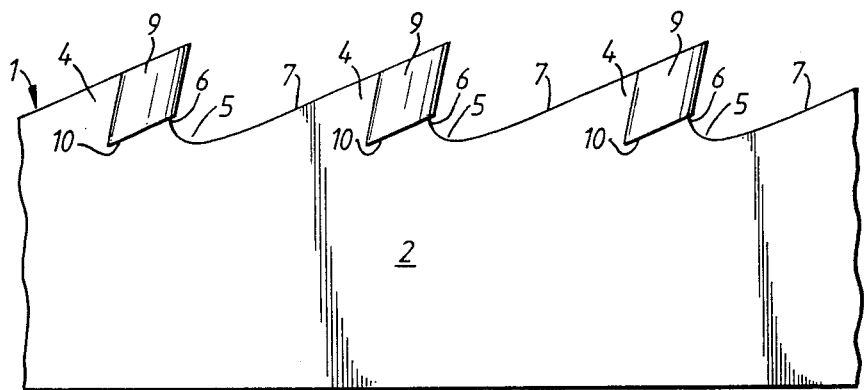
Figure 3:
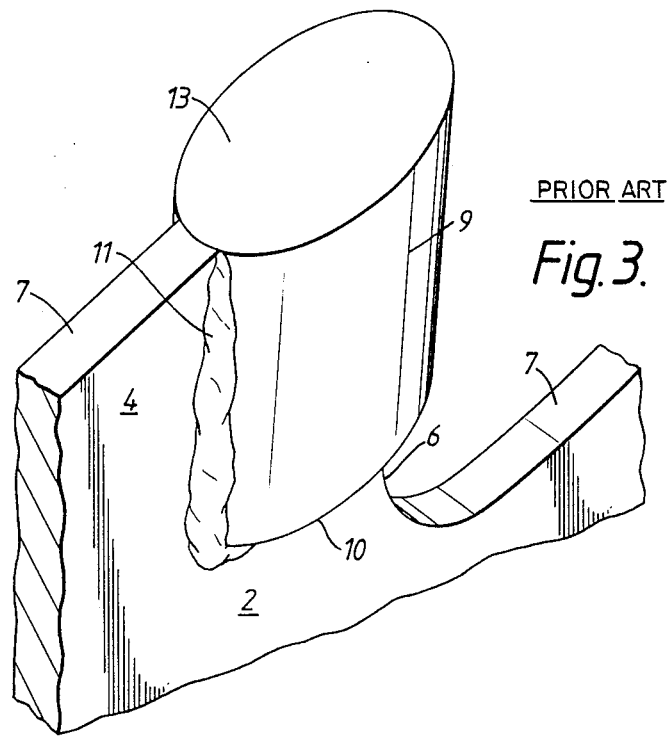
FIG. 3 is a schematic perspective view to a very large scale of the tipped tooth shown in FIG. 2.

Referring now to FIGS. 2 and 3, these illustrate the blade of FIG. 1 but after a Stellite rod tip 9 has been mounted to the teeth 4. As will be noted the tip 9 is at least partially nested into the material of the tooth in a notched region 10.

Since the tip 9 has in the case of electrical resistance welding been mounted to the blade tooth by a combination of force and melting by electrical heating of the blade tooth excess material arising from the melting and tip setting is forced out to provide very ragged appearance as at 11. This can particularly be seen from FIG. 3.

Figure 4:
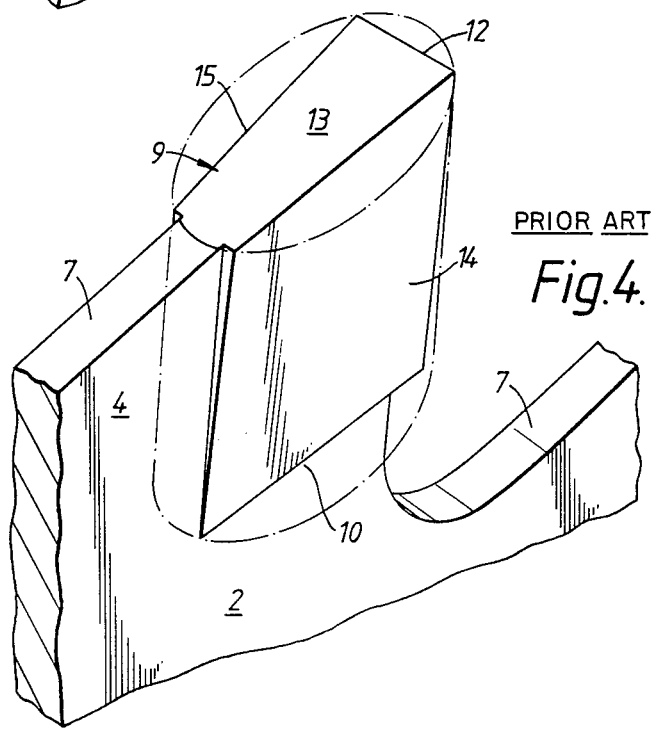
FIG. 4 is a schematic representation to a very large scale of the tipped tooth of FIG. 2 but after the tip has been machined into its operational form, the Figure also showing the outline of a tip forming length prior to machining.

It will also be noted from FIG. 3 that the cylindrical form of the Stellite rod necessitates removal of a relatively large volume of Stellite in addition to the blade tooth material shown at 11 in order to attain the requisite planar shape to the tip as is shown in FIG. 4. In this Figure the tip has its front face 12, its top face 13, and its side faces 14 and 15 machined to the requisite size and angular inter-relationships. The FIG. 4 also shows very schematically the original outline of the Stellite rod to indicate clearly the extent of Stellite removal required to form the tip.

In accordance with the proposals of the invention the major part of the machining required to establish the required working faces for the tips and the correct angular inter-relationships between the various faces is substantially reduced by preforming the Stellite rod so that it has at least one planar face which, when a length thereof is mounted to a tooth 4 approximates to the required final form of the tip.

Figure 5:
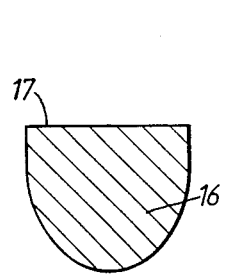
FIG. 5 is a transverse cross sectional view of a tip forming rod preformed in accordance with the concepts of the invention.

Referring now to FIG. 5 this shows in transverse cross section the profile of one form of a Stellite rod in accordance with the concepts of the invention. The Stellite rod is in the form of a shaped rod or bar 16 with a profile as shown in FIG. 5. As will be seen from FIG. 5 the profile is provided with an axially directed planar face 17 which in, the example shown, is intended to provide the front face 12 of a tip 9. It will be noted from FIG. 5 that the thickness of the tip in the direction rearwardly from the front face 12 is relatively large as compared with the cutting edge width of the tip.

Figure 6:
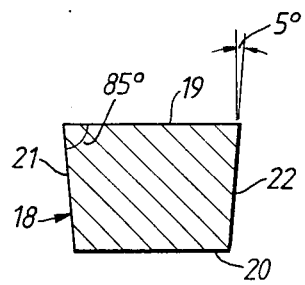
FIG. 6 is a transverse cross sectional view of a preferred tip forming rod preformed in accordance with the concepts of the invention.

Referring now to FIG. 6 this shows a cross section of a preferred embodiment of a Stellite rod 18 preformed in accordance with the proposals of the invention so that it has an initial cross section which presents four planar faces 19, 20, 21 and 22 running lengthwise of the Stellite bar or rod 18. The relative dimensions are such that the cross-section of the rod is trapezoidal. Thus, for example, in a particular embodiment the width of the face 19 is six millimeters, the width of the face 20 is five point three millimeters and the distance between the front face and the rear face is four millimeters which is, with the dimensions given, approximately the same as the lengths of the side faces 21 and 22.

With these dimensions the side faces incline inwardly with respect to the face 19 at an angle of eighty five degrees. When tip forming lengths of the rod 18 are mounted to the blade teeth 4 these faces 19, 21 and 22 are arranged to provide when, the tip forming length is applied to a tooth and after machining, the tip front and side faces.

Figure 7:
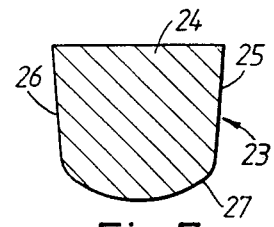
FIG. 7 is a transverse cross sectional view of a further form for a tip forming rod preformed in accordance with the concepts of the invention.

Referring now to FIG. 7 this shows a cross section of a still further embodiment of a Stellite rod 23 preformed in accordance with the proposals of the invention so that it has an initial cross section which presents three planar faces 24, 25 and 26 running lengthwise of the Stellite bar or rod 18 together with a portion 27 which has a curved form. When tip forming lengths of the rod 18 are mounted to the blade teeth 4 these faces 24, 25 and 26 are arranged to provide when, the tip forming length is applied to a tooth and after machining, the tip front and side faces.

The upper and lower ends of the tips are parallel to each other. Conveniently, these surfaces are produced as a result of the cutting-off of a tip forming length from the feed rod or bar at such angle as to correspond to the requisite top face angle. It follows that this cutting action automatically forms the bottom face of the next tip to be produced from the bar or rod.

When forming the tips according to the invention the rod or bar is held in suitable clamping arrangements which ensure that the orientation of the faces of the tip is correctly set with respect to the tooth to which it is to be mounted. These clamping arrangements will be associated with means for feeding the rod or bar end into cooperation with the teeth to be tipped.

It will thus be appreciated that the provision of the Stellite rods preformed such as are shown in FIGS. 5, 6 and 7 reduces considerably the amount of machining to be effected and thus the time that the machining requires. In addition, the working life of grinding wheels involved is correspondingly greatly increased. Furthermore, the amount of sustained heat produced as a result of the machining operations required is likewise greatly reduced and this results in a significant reduction in the risk of undesired surface hardening of the tooth body and thus the risk of fracture of the tooth during use of the saw.

In practice, the actual dimensions and angular interrelationships between the tip faces and thus the resulting profiles of the Stellite rods according to the invention will be related to the ultimate required cutting profile for the tips 9 on the teeth. Thus it has been found that the side faces can be inclined at an angle to the front face which can conveniently lie within the range of eighty two to ninety degrees; with a preferred angle range of eighty three to eighty seven degrees, a particular angle being eighty five degrees.

In addition, the overall width of the front face at the cutting edge thereof will be set by the cutting width length considered appropriate for practical application in relation to the expected type of material to be cut.

A possible range for the width being between two and eight millimeters. It will be noted from the Figures that the thickness of the tip is well over one-half of the width of the front face.

An important requisite for a tip for a cutter tool such as a band or circular saw is that the tip should be of such dimensions as to permit resharpening.

In practice, it is a desirable requirement that it should be possible to resharpen a blade a number of times. To enhance the resharpening possibilities it is desirable that the thickness of a tip, in the direction from front to rear of the tip, should be as large as possible having regard to factors such as the dimensions of the blade teeth and tooth gullet regions.

The tips produced from elongate lengths of Stellite i.e., from bar or rod preshaped or formed in accordance with the proposals of the invention inherently satisfies such a requirement as it results in the formation of tips with a considerable thickness for a particular cutting width. This may be particularly seen from FIGS. 5,6 and 7. As may be clearly noted from these Figures the thickness of a tooth, in relation to the cutting width of the tip is far greater than can be achieved from the previous requirements of having to machine away approximately one-half of the original material of a circular cross section rod hitherto used for the production of tips.

A further important aspect of the present invention is that preforming the rods or bars can be in accordance with the particular tip shape ultimately desired for the tips to be produced from the rod or bar.

In other words it is possible to provide tips having dimensional ratios which are effectively determinded by the intended usage of the tip rather than a dimensional ratios controlled by geometrical considerations as would rise when machining a tip form from a circular cross-section rod or bar.

It is to be noted that the term Stellite used to identify the material of the Tips is a Registered Trade Mark of a Canadian Company known as Deloro.

Whilst specific mention has been made in realation to the use of Stellite as a material for forming saw blade tooth cutting edge forming tips it will be appreciated that the teaching of the invention can be applied to other materials which can be used as hard material tips for tools and which are produced in circular cross section rod or bar form from a melt.

I claim:

1. A method of producing cutting edges of tools involving teeth having tips of a material harder than than of the remainder of the tool comprising the steps of:
    forming a rod of Stellite having at least one longitudinally extending planar surface,
    mounting the Stellite in a predetermined direction with respect to the tool such that the planar surface provides the front face of a tip of a tooth, and
    cutting the rod of Stellite in a plane transverse to the planar surface to form a top surface of the tip.

2. A method as claimed in claim 1 wherein the forming step further comprises forming the Stellite rod with two further longitudinally directed planar surfaces which intersect the plane of said at least one planar surface at an angle of less than 90 degrees, and the mounting step further comprises mounting the rod of Stellite so that said further longitudinally directed planar surfaces form side faces of the tip.

3. A method as claimed in claim 1 wherein the forming step further comprising forming the Stellite rod with four planar longitudinally directed surfaces which are angularly related to each other, and the mounting step further comprises mounting the rod of Stellite so that one of the planar surfaces forms the front face of the tip, the surface that is opposite to the one face provides a rear face for the tip, while the remaining two surfaces provide the side faces of the tip.

4. A rod of Stellite from which tips for use with tools involving teeth having tips of material that is harder than that of the remainder of the teeth may be successively cut, in which said Stellite rod material is so preformed during the initial production thereof as to present at least one longitudinally extending planar surface which when a tip forming length is mounted to a tooth to be tipped with the planar surface in a predetermined direction with respect to the tool, the planar surface provides the front face of the tip.

5. A rod of Stellite as claimed in claim 4, in which the rod is formed with two further longitudinally directed planar faces which intersect the plane of said longitudinally extending planar surface and lie at an angle of less than 90 degrees with respect to the plane of the surface, whereby on mounting the tip forming material to a tooth the further faces provide the side faces of the tip and are relatively inclined at an angle related to the required side flank angle of the resulting tip, and whereby after the tip forming length has been secured to the tooth, the rod is severed at such angle with respect to the planar faces as to provide a cut surface which is in substantial alignment with the top face of the tip.

6. A rod of Stellite as claimed in claim 4 or 5, and in which the bar has four axially extending planar surfaces which correspond to the front face, the rear face and the side or flank faces of the remaining tips.

7. A method for economically producing cutting tools having hardened teeth consisting essentially of Stellite set in softer cutting tool material comprising the steps of:
    providing a bar of Stellite having at least one longitudinally extending planar surface,
    dividing the bar to form a discrete tooth, orienting the tooth to present at least one planar surface at a desired working angle with respect to the cutting tool, and attaching the tooth section to the cutting tool at the desired working angle.

8. A method for economically producing cutting tools having hardened teeth consisting essentially of Stellite set in softer cutting tool material comprising the steps of:

provviding a bar of Stellite which has a plurality of planar surfaces defining a quadrilateral transverse cross section and which can be divided into a tooth section and a supply bar section, orienting the tooth section to present at least one of the planar surfaces at a desired working angle with respect to the cutting tool, and attaching the tooth section to the cutting tool at the desired working angle.

9. A method for economically producing cutting tools having hardened teeth consisting essentially of Stellite set in softer cutting tool material comprising the steps of:

providing a bar of Stellite which has a non-circular transverse cross section including at least one planar surface and which can be divided into a tooth section and a supply bar section, orienting the tooth section to present the at least one planar surface at a desired working angle with respect to the cutting tool, and attaching the tooth section to the cutting tool at the desired working angle.

10. A method for economically producing cutting tools having hardened teeth consisting essentially of Stellite set in softer cutting tool material comprising the steps of:

providing a bar of Stellite having a tooth section and a supply bar section and having an at least one longitudinally extending planar surface, orienting the tooth section to present an at least one planar surface at a desired cutting angle with respect to the cutting tool, and attaching the tooth section to the cutting tool at the desired cutting angle to present a cutting surface.

* * * * *